United States Patent [19]

Shih et al.

[11] Patent Number: 5,118,979
[45] Date of Patent: Jun. 2, 1992

[54] CANTILEVER SPRING CONTACT FOR RETAINING RINGS ON DYNAMOELECTRIC MACHINE

[75] Inventors: True T. Shih, Schenectady; James F. Hopeck, Mechanicville, both of N.Y.

[73] Assignee: General Electric Company, Schenectady, N.Y.

[21] Appl. No.: 628,898

[22] Filed: Dec. 18, 1990

[51] Int. Cl.⁵ .............................................. H02K 33/00
[52] U.S. Cl. ................................ 310/214; 310/261; 310/270
[58] Field of Search ............... 310/261, 42, 214, 270, 310/105, 260, 198

[56] References Cited

U.S. PATENT DOCUMENTS

| | | | |
|---|---|---|---|
| 2,773,210 | 12/1956 | Vogt | 310/270 |
| 2,960,360 | 11/1960 | Taylor | 287/103 |
| 3,324,324 | 6/1967 | Richardson et al. | 310/214 |
| 3,395,299 | 7/1968 | Quay et al. | 310/261 |
| 3,476,966 | 11/1969 | Willyoung | 310/270 |
| 3,614,498 | 10/1971 | Bank | 310/262 |
| 4,177,398 | 12/1979 | Zagorodnaya et al. | 310/270 |
| 4,275,324 | 6/1981 | Flick | 310/270 |
| 4,316,114 | 2/1982 | Zagorodnaya et al. | 310/270 |
| 4,430,589 | 2/1984 | Sakuyama et al. | 310/52 |
| 4,439,701 | 3/1984 | Okamoto et al. | 310/45 |
| 4,443,722 | 4/1984 | Hirao et al. | 310/45 |
| 4,462,152 | 7/1984 | Okamoto et al. | 29/598 |
| 4,667,125 | 5/1987 | Kaminski et al. | 310/214 |
| 4,843,271 | 6/1989 | Shah | 310/217 |

FOREIGN PATENT DOCUMENTS

| | | | |
|---|---|---|---|
| 0379619 | 8/1964 | Switzerland | 310/214 |
| 0747065 | 3/1956 | United Kingdom | 310/270 |
| 1143595 | 2/1969 | United Kingdom | 310/270 |

Primary Examiner—R. Skudy
Attorney, Agent, or Firm—Nixon & Vanderhye

[57] ABSTRACT

In a dynamoelectric generator, a low-resistance electrical contact is provided by a cantilever beam mounted between the outer surface of the rotor body and an overlapping retaining ring. This cantilever beam is part of the wedges in the rotor body and provides a conductive current path for high-frequency eddy currents induced on the surface of the rotor and retaining rings at all operating speeds.

6 Claims, 3 Drawing Sheets

CANTILEVER SPRING CONTACT FOR RETAINING RINGS ON DYNAMOELECTRIC MACHINE

This invention was made with United States Government support under a contract with the United States Navy. The federal government has certain rights in this invention.

FIELD OF INVENTION

This invention relates to an electrical contact for bridging high-frequency currents between the retaining rings and rotor of a dynamoelectric machine.

RELATED APPLICATIONS

This application relates to copending and commonly assigned application Ser. No. 628,900, filed Dec. 18, 1990, entitled "Multilam or Belleville Spring Contact For Retaining Rings in a Dynamoelectric Machine".

This application also relates to copending and commonly assigned application Ser. No 07/522,037, filed May 11, 1990, entitled "Reducing Harmonic Losses in Dynamoelectric Machine Rotors."

BACKGROUND AND SUMMARY OF THE INVENTION

Generator rotors have a large diameter cylindrical body from which extends at both ends a smaller diameter shaft. The rotor body has a series of longitudinal slots cut deep into its outer circumference. In these slots are inserted field windings that extend the length of the rotor body. There are wedges in the slots that hold the windings in place against centrifugal forces exerted when the rotor rotates. These wedges are above the windings and may protrude radially outward of the outer circumferential surface of the rotor body.

The end turn portions of the windings extend axially out beyond each end of the rotor body. These end turns electrically connect the longitudinal section of a winding in one slot with a similar winding section in another slot. As the rotor spins, the end turns are thrust radially outward by centrifugal force. This radial movement of the end turns is confined by retaining rings that enclose the end turns and are placed over the ends of the rotor body. Centrifugal forces cause the end turns to press firmly against the inside surface of the retaining rings. In this way, the retaining rings hold the end turns in place during operation of the generator.

Retaining rings are usually attached to the ends of the rotor body by shrink fitting. The rim of one end of the retaining ring is shrink fitted tightly around a circumferential lip on the end of the rotor body. In addition, locking keys securely hold the retaining rings onto the rotor body against axial movement of the rings. These keys fit in opposing grooves in the retaining ring and in both the rotor teeth and wedges. Without these keys, the thermal expansion of the field coils and the retaining rings can cause the retaining rings to slide axially off the rotor.

In some applications, high frequency current exist on the surface of the rotor body and retaining rings. For example, when the generator is used in conjunction with a load commutated inverter (LCI), cycloconverter (CCV) or other non-linear load, eddy currents are induced on the surface of the rotor. These rotor eddy currents are the results of harmonics of the input and/or output currents of the LCI and CCV devices. U.S. Pat. No. 4,843,271 entitled "Conductive Metal Inserts in Rotor Dynamoelectric Machine" issued to Manoj Shah provides a detailed description of eddy currents and the problems that they can create. The eddy currents have high frequencies and, thus, primarily reside at and near the surface of the rotor and retaining rings.

Losses due to these eddy currents in the rotor result in undesirable $I^2R$ (Joulean) heating. Accordingly, low resistance current paths are needed to reduce eddy current losses and thus minimize heating. The rotor body and retaining rings, typically made of high strength steel alloys, are not themselves good conductors. The relatively high electrical resistance of the retaining rings and rotor body to the eddy currents will cause high losses and heating. To avoid these losses, eddy shields cover the outer surfaces of the rotor body and retaining rings to provide a low resistance electrical path for surface eddy currents. The shields reduce losses of eddy currents and can prevent localized heating of the rotor body and retaining rings.

An eddy shield is commonly a thin copper layer applied to the outer surfaces of the rotor body and retaining rings. The shield can be a jacket or a cladding. In the alternative, an eddy current shield for the rotor can be provided by specially configured wedges made of conductive chromium-copper or other alloys that have wings that overhang the rotor teeth adjacent the wedge. These wedges are disclosed in the copending application entitled "Reducing Harmonic Losses in Dynamoelectric Machine Rotors" referenced above and incorporated by reference.

While eddy shields substantially reduce current losses, they do not reduce the magnitude of the eddy current. The current shields merely provide low resistance paths for the currents. Any interruption or point of high resistance in these current paths will cause additional loss and localized heating. It is desirable to provide a reliable low resistance electrical connection between the rotor body and retaining rings. As discussed below, prior couplings between rotors and retaining rings do not provide good electrical connections for high-frequency current.

One example of an eddy current junction between the rotor and retaining ring is shown in U.S. Pat. No. 4,275,324 entitled "Dynamoelectric Machine Having Shielded Retaining Rings." This patent discloses a radial extension on the wedge that rises to meet the eddy current shield on the retaining ring. The patent does not clearly disclose how the contact is made between the extension on the wedge and the eddy current shield to the retaining ring, or how the contact can be maintained at all operating speeds.

The present invention provides a reliable electrical contact for eddy currents from the rotor surface to the retaining ring at all operating speeds of the rotor. A cantilever beam spring is formed on the top surface of the end portions of the wedges. As the retaining rings slide over the ends of the wedges, they overlap the cantilever beams. The retaining rings constrict tightly around the rotor body by the application of shrink fit techniques. By shrink fitting, the retaining rings clamp down on the cantilever sections of the wedges. The grip of the retaining ring on the cantilever beams forms a reliable electrical contact for eddy currents.

It is an objective of this invention to provide a reliable electrical junction between a rotor and a retaining ring at all operating speeds for high-frequency eddy currents. In particular, it is an object of this invention to provide such a junction by means of a cantilever beam on a wedge that is in contact with an overlapping end of the retaining ring.

DETAILED DESCRIPTION OF THE DRAWINGS

Figure 1:
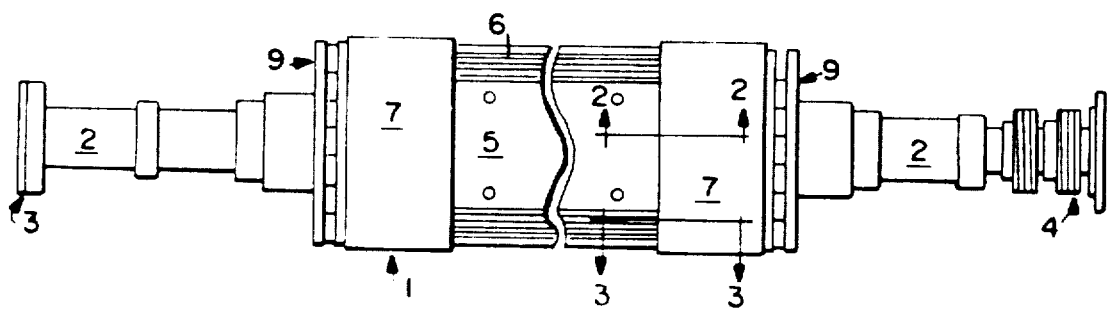
FIG. 1 is a prior art illustration of a perspective view of a generator rotor having coil windings and retaining rings.

FIG. 1 illustrates a rotor 1 for a generator (or motor). The rotor has a shaft 2 that has a power turbine (or mechanical load) coupling 3 and is supported by bearings that are not shown. The rotor shaft also has a collector ring 4 that provides an electrical junction for the rotor field winding.

Figure 2:
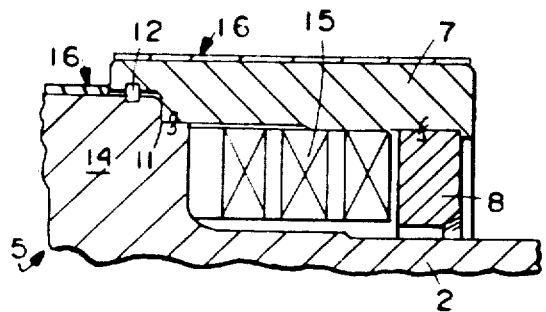
FIG. 2 is a prior art illustration of an axial cross section taken along line 2—2 of FIG. 1.

The rotor has a large diameter body 5 that holds the coil windings 6. This body has longitudinal slots in which the coil windings are mounted. The slots extend the length of the body. Annular retaining rings 7 cap both ends of the rotor body. The retaining rings are supported on one end by the and body and on the on the other end by a centering ring 8 (FIG. 2). Adjacent the retaining rings are fans 9 that cool the retaining rings and other rotor components.

Figure 3:
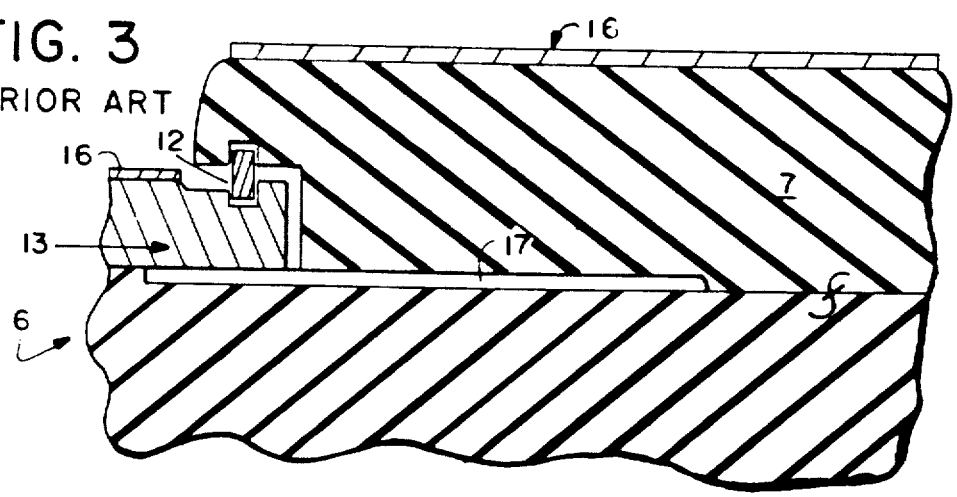
FIG. 3 is a prior art illustration of an axial cross section taken along line 3—3 of FIG. 1.

As shown in FIGS. 2 and 3, retaining rings slide over the end of the rotor body 5. The retaining ring is attached to a lip 11 on the end of the body by a shrink fit process. The retaining rings are also shrink fit onto the centering rings 8. In addition, an annular locking ring 12 secures the retaining ring to the body. The locking ring engages grooves that extend circumferentially around the rotor and retaining rings. The groove in the rotor is cut in the teeth 14 of the rotor body and the wedges 13. The wedges 13 hold the coils in the slots and extend beyond the outside surface of the rotor body.

The end turns 15 on the coil windings are enclosed by the retaining rings 7. The end turns extend axially from the end of the rotor body. The end turns bend radially outward when subjected to the centrifugal forces arising from the rotating rotor. The retaining rings confine this radial movement of the end windings.

In the prior art, eddy current shields 16 covered the outer surfaces of the rotor body and retaining rings. The prior art did not provide a low resistance electrical junction between the rotor and retaining ring. A finger amortisseur 17 provided an electrical connection between the wedge 13 and the retaining ring 7. The amortisseur is a copper insert that extends in axial slots in the underside of the wedge and the retaining ring. The amortisseur 17 is too far below the outer surface of the wedge and rotor body to conduct eddy currents. The current penetration depth (skin depth) of the eddy currents is inversely proportional to the square root of its frequency. The relatively high-frequency harmonic eddy currents do not penetrate the rotor to the depth of the bottom of the wedge and amortisseur. Accordingly, the amortisseur is not an effective current path for high frequency eddy currents.

In the prior art, electrical current could also be between the rotor and retaining ring through the shrink fit of the retaining ring on the lip 11 of the rotor. The lip 11 is below the outer surface of the rotor and below the skin depth of the eddy currents. Accordingly, the shrink fit between the rotor and retaining ring is below the surface eddy currents and does not effectively convey these currents.

Prior designs provided another current path through the locking key 12 between the rotor and retaining ring. The locking key is close to the surface of the rotor body and, thus, to the eddy currents. However, the key moves within the opposing grooves of the wedge and retaining ring. Accordingly, the electrical contact through the locking key is intermittent and inadequate to reliably conduct eddy currents.

Figure 4:
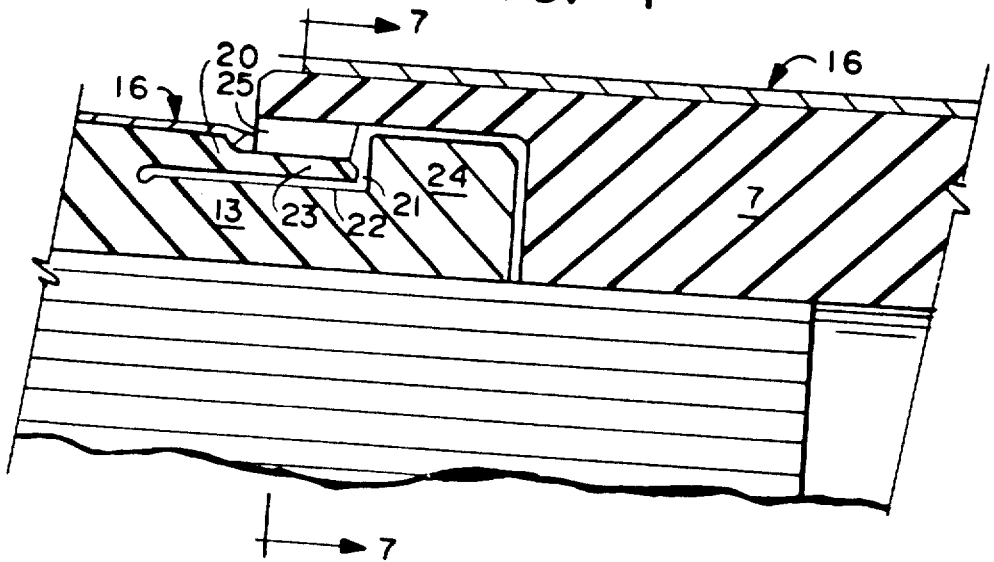
FIG. 4 is an enlarged view of an axial cross section taken along line 3—3 of FIG. 1 of one embodiment of the invention.

FIG. 4 shows one embodiment of the present invention. Eddy currents flow on the eddy current shields 16 from the rotor and retaining ring. A low-resistance eddy current path between the retaining ring 7 and rotor body is provided where the retaining ring grasps a cantilever beam 20 on the wedge 13. The cantilever beam is formed in the top surface of the wedge. The cantilever beam is made by milling processes that first make a cut 21 in the wedge normal to the wedge surface and then make a longitudinal cut 22 underneath the surface of the wedge. These cuts extend through the width of the wedge and the longitudinal cut extend a short distance along the length of the wedge. The portion of the wedge that overhangs the longitudinal cut is the cantilever beam 20. The front lip 23 of the cantilever beam is machined to provide a smooth surface to contact with the retaining ring. In addition, the lip is machined so that it is shorter than the end 24 of the wedge.

Figure 6:
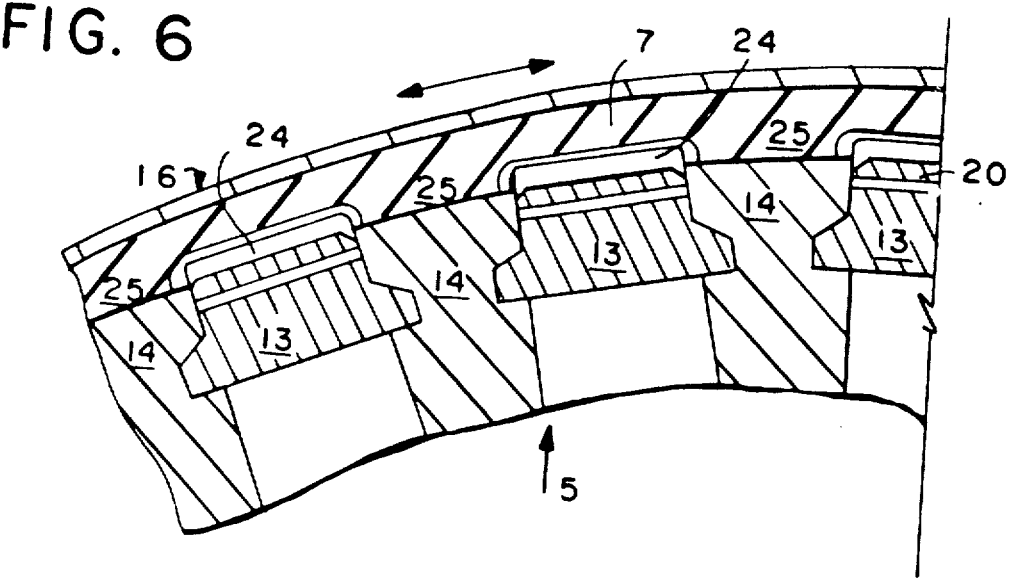
FIGS. 6 and 7 are axial cross sections taken along line 7—7 of FIG. 4 but in FIG. 6 the retaining ring is in a different rotational position than in FIGS. 4 and 7.
Figure 7:
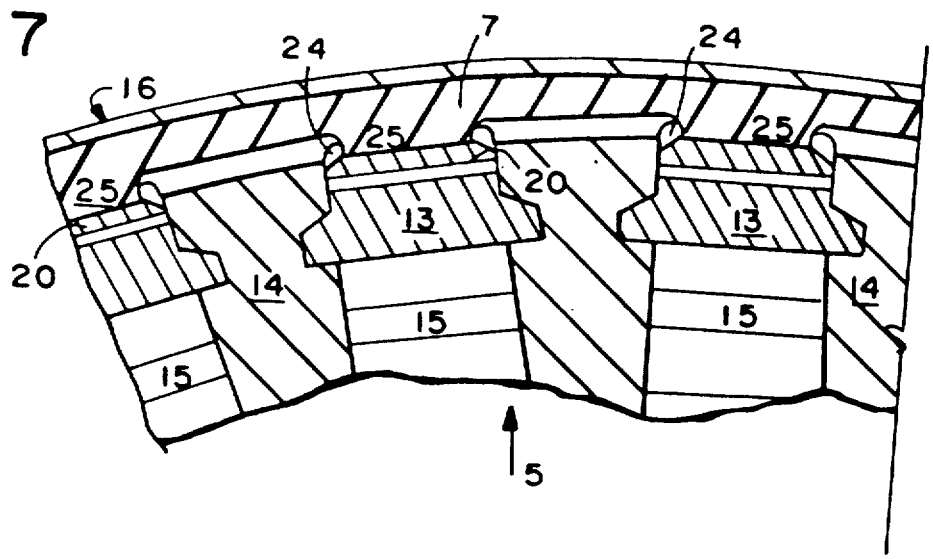

The end 24 of the wedge protrudes radially outward of the cantilever beam lip and the rotor teeth 14 FIGS. 6, 7. The protruding wedge end 24 prevents the nose teeth 25 of the retaining ring from sliding off the rotor body. Thus, the end of the wedge serves the same purpose as does the locking rings in prior designs.

The retaining rings have nose teeth 25 on the inside surface of their rim. The nose teeth engage the cantilever beam of the wedges. As shown in FIGS. 6 and 7, there are a plurality of nose teeth forming a circular array around the inside circumference of the retaining ring 7. Each nose tooth 25 protrudes inwardly from the inner surface of the retaining ring. The width of each tooth is slightly less than the width of the wedges. The nose teeth are separated from each other by a least the width of the wedges to allow the retaining ring to slide on the rotor body. The tip of each nose tooth is machined to provide a good electrical contact against the lip 23 of the wedge cantilever beam.

Figure 5:
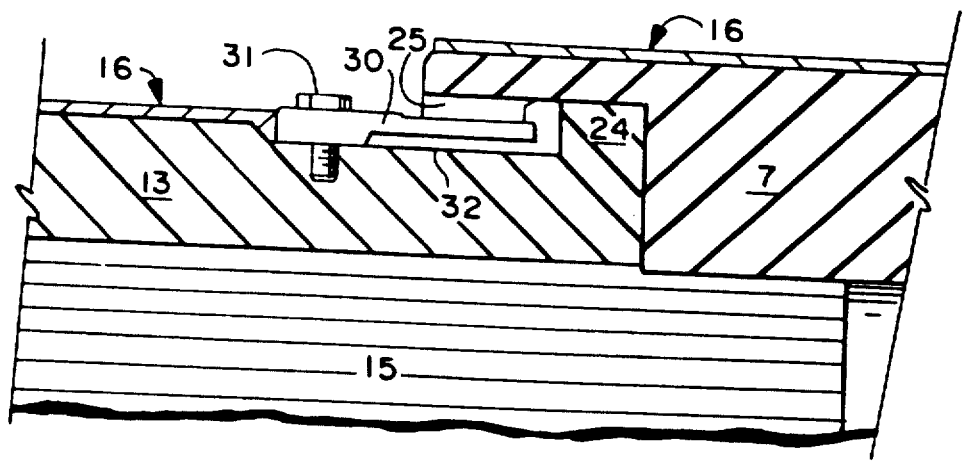
FIG. 5 is an enlarged view of an axial cross section taken along line 3—3 of FIG. 1 of a second embodiment of the invention.

FIG. 5 shows an alternative cantilever beam 30 for the wedge 13. The cantilever beam is not integral with the wedge as in the first embodiment. Rather, the cantilever is bolted to the wedge. A bolt 31 is screwed into a threaded hole in the wedge 13. The cantilever beam is mounted in a notch 32 cut out of the wedge so that the top of the cantilever beam is below the top surface of end 24 of the wedge.

The cantilever beam is made of a resilient metal. The cantilever section can itself be a good conductor of eddy currents or be coated with an electrically conductive eddy current shield 16.

FIGS. 6 and 7 show the retaining ring being mounted onto the rotor body 5. The retaining ring is heated and slid over the end of the rotor body. The retaining ring is initially positioned with its nose teeth aligned with the rotor teeth 14 so that the nose teeth are not obstructed by the protruding ends 24 of the wedges. As the ring is slid on the rotor, the nose teeth move between the wedges. After the retaining ring is slid completely onto the rotor body, the retaining ring is rotated to align the nose teeth with the wedges.

FIG. 7 shows the nose teeth in alignment with the wedges. After the retaining ring cools down, the nose teeth 25 clamp down on the cantilever beams 20 of the wedges. The clamping force of the retaining rings deflect the cantilever beams radially inward. This deflection creates an opposed spring biasing force of the cantilever beam.

The clamping of the retaining rings onto the wedges creates a low-resistance electrical contact between the nose teeth of the retaining ring and the cantilever beams of the wedges. This contact is resistant to centrifugal forces and heat expansion because the nose teeth and cantilever section are biased together. Moreover, the contact provides an effective path for eddy currents because it is at the surface of the rotor where the eddy currents flow. The eddy currents flow from the eddy current shield 16 on the rotor body and/or wedges, through the cantilever beam and retaining ring, to the eddy current shield on the retaining ring.

While the invention has been described,in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dynamoelectric machine comprising:
   a rotor body having a plurality of longitudinal slots in its outer surface;
   electrically-conductive windings having longitudinal sections located in said slots and end turns connecting said longitudinal sections and extending axially out from said rotor body;
   wedges in said rotor slots confining said longitudinal sections in said slots, at least one wedge having a cantilever beam;
   a retaining ring attached to an axial end of said rotor body, said retaining ring enclosing said end turns to restrain radial outward movement of the end turns, said retaining ring overlapping said cantilever beam of at least one wedge and clamping onto said cantilever beam to form a low-resistance electrical contact between the wedge and retaining ring.

2. A dynamoelectric machine as in claim 1 wherein said rotor body and said wedges comprise eddy current shields, and the contact between the retaining ring and the cantilever beam providing a conductive electrical path for facilitating eddy currents from said eddy current shields on the rotor body to the retaining ring at all operating speeds.

3. A dynamoelectric machine as in claim 2 wherein at least one of said eddy current shields covering an outer surface of said retaining ring.

4. A dynamoelectric machine as in claim 1 wherein said cantilever beam is a separable component of the wedge.

5. A dynamoelectric machine comprising:
   a rotor body having a plurality of longitudinal slots in its outer surface;
   electrically-conductive windings having longitudinal sections located in said slots and end turns connecting said longitudinal sections and extending axially out from said rotor body;
   wedges in said rotor slots above the longitudinal sections of said windings and confining said longitudinal sections in said slots, at least one wedge having an integral cantilever beam at its surface;
   a retaining ring attached to an axial end of said rotor body, said retaining ring enclosing said end turns to restrain radial outward movement of the end turns, said retaining ring overlapping said cantilever beam of at least one of said wedges and clamping onto said cantilever beam to form a low-resistance electrical contact between the wedge and retaining ring.

6. In a dynamoelectric machine comprising:
   a cylindrical rotor body having a plurality of longitudinal rotor slots in its outer surface;
   electrically-conductive windings having longitudinal sections in said rotor slots and end turns electrically coupling said longitudinal sections in a plurality of said slots, said end turns adjacent an axial end of said rotor body;
   wedges in said rotor slots above said windings, said wedges confining the longitudinal sections of said windings in their respective slots, said wedges comprising an eddy current shield on an outer surface, a cantilever beam towards an end of at least one of said wedges, and a protruding end section extending radially outward of said rotor body and the cantilever beam;
   a retaining ring secured to an axial end of said rotor body and enclosing said end turns, said retaining ring overlapping the cantilever beam and said end of of said wedges, said retaining ring comprising an eddy current shield at the outer surface of said retaining ring and an annular array of nose teeth at an inner periphery of said retaining ring, said nose teeth extending radially inwardly of said protruding end section of said wedge and of at least one of the wedges and being aligned with said wedges when mounted on said rotor body;
   wherein said nose teeth clamping down on said cantilever beam and said cantilever beam being biased against said nose teeth to provide a low resistance coupling for high-frequency currents between the wedges and retaining ring.

* * * * *